US007251502B1

(12) United States Patent
Page et al.

(10) Patent No.: US 7,251,502 B1
(45) Date of Patent: Jul. 31, 2007

(54) MOBILE AERIAL COMMUNICATIONS ANTENNA AND ASSOCIATED METHODS

(75) Inventors: Joe Page, Suwanee, GA (US); Pichet Chintrakulchai, Lawrenceville, GA (US); Barrett Kreiner, Norcross, GA (US)

(73) Assignee: AT&T Intellectual Property, Inc., Wilmington, DE (US)

( * ) Notice: Subject to any disclaimer, the term of this patent is extended or adjusted under 35 U.S.C. 154(b) by 879 days.

(21) Appl. No.: 10/090,379

(22) Filed: Mar. 4, 2002

(51) Int. Cl.
*H04B 1/38* (2006.01)

(52) U.S. Cl. .................. 455/562.1; 455/66.1; 343/757

(58) Field of Classification Search ................ 455/562, 455/66, 517, 11.1, 562.1, 66.1; 343/757; 375/356, 358, 220
See application file for complete search history.

(56) References Cited

U.S. PATENT DOCUMENTS 6,611,236 B1 * 8/2003 Nilsson ...................... 343/757
6,678,341 B1 * 1/2004 Miyake et al. .............. 375/356
2003/0148736 A1 * 8/2003 Wright et al. ................. 455/66

OTHER PUBLICATIONS

HALO™ Network; Diamandis, P.H. and Colella, N.J.; pp. 1-12, none dated.

* cited by examiner

*Primary Examiner*—Joseph Feild
*Assistant Examiner*—Phuoc Doan
(74) *Attorney, Agent, or Firm*—Merchant & Gould

(57) ABSTRACT

A mobile aerial communications antenna assembly including a mobile aerial assembly and a transportation system operably connected to the mobile aerial assembly, wherein the transportation system includes a lift source operable for generating a lift force and a plurality of directional forces, providing the mobile aerial assembly with maneuverability in three dimensions. The mobile aerial communications antenna assembly also including a communications system operably connected to the mobile aerial assembly, wherein the communications system includes a communications device operable for transmitting and receiving a plurality of mobile communications signals. The mobile aerial communications antenna assembly further including a control system in communication with the transportation system and/or the communications system, the control system operable for controlling the operation of the transportation system and/or the communications system.

28 Claims, 7 Drawing Sheets

MOBILE AERIAL COMMUNICATIONS ANTENNA AND ASSOCIATED METHODS

FIELD OF THE INVENTION

The present invention relates generally to the field of mobile communications. More specifically, the present invention relates to a mobile aerial communications antenna that includes a transportation system, a communications system, and a control system. The mobile aerial communications antenna may be used, for example, as a temporary cellular antenna, where the use of a conventional large, fixed cellular antenna tower is impractical, or where it is difficult to position a conventional mobile cellular antenna. The mobile aerial communications antenna may also be deployed in search and rescue operations.

BACKGROUND OF THE INVENTION

A conventional cellular antenna typically includes a large steel tower structure that is fixedly attached to a piece of property, such as the ground or a building. This attachment is typically accomplished using concrete pilings or castings, a support structure, or the like. The cellular antenna also typically includes one or more protective structures, such as one or more steel boxes or a small building, that house one or more transmitters and/or receivers operable for serving a plurality of mobile communications devices, and a plurality of mobile communications services customers. Optionally, the cellular antenna may be operably connected to a trunk and send signals to and receive signals from a public-switched telephone network ("PSTN"). This is typically accomplished through a mobile switching center ("MSC") that includes a plurality of radios, an interface circuit, and a plurality of feeder lines. Such hard-wired cellular antennas are said to have "connectivity." Other cellular antennas may act as relays, providing only peer-to-peer communications. In this context, the conventional cellular antenna may function as a "base station," and an expensive piece of infrastructure.

The mobile communications field has experienced explosive growth in recent years. This growth has been due, in large part, to an increase in the ownership and usage of mobile communications devices, such as cellular telephones, pagers, personal digital assistants ("PDAs"), laptop computers, and the like. This growth is expected to continue as these mobile communications devices become more sophisticated and as mobile Internet access improves. This increase in the demand for mobile communications services has been especially pronounced in metropolitan areas, where large numbers of mobile communications services customers are present. The density of cellular antennas is at its highest in such areas. Problems may arise, however, when there is a temporary increase in the demand for mobile communications services in these areas, or when there is a temporary increase in the demand for mobile communications services in otherwise low-demand areas not served by many cellular antennas. For example, problems may arise when a sporting event is held or when a disaster or emergency occurs in a metropolitan area, or when a festival is held in a rural area. If there is an existing cellular infrastructure, it may be overwhelmed in such cases. What is typically needed is a temporary increase in the density of cellular antennas to meet the temporary increase in the demand for mobile communications services.

One possible solution to the problems described above is to position a temporary or mobile cellular antenna in the area experiencing the increase in the demand for mobile communications services. A conventional temporary cellular antenna typically includes a small steel tower structure that is fixedly attached to a piece of property, such as the ground or a building. This attachment is typically accomplished using a support structure or the like. A conventional mobile cellular antenna, also referred to as "cellular on wheels" ("COW"), also typically includes a small steel tower structure. The small steel tower structure, however, is typically movably attached to a vehicle, such as a van or a flatbed truck. Although such solutions are marginally effective, it is not always possible to position a temporary or mobile cellular antenna in an area experiencing an increase in the demand for mobile communications services. In metropolitan areas, for example, the use of such structures may be prohibited by zoning regulations or space constraints. In rural areas, for example, the use of such structures may be prohibited by environmental regulations or geographical/topographical constraints. Even if a temporary or mobile cellular antenna may be positioned in the area experiencing the increase in the demand for mobile communications services, it may not be possible to move the temporary or mobile cellular antenna to achieve the best available transmission and reception characteristics. In other words, it may not be possible to optimize the performance of the temporary or mobile cellular antenna and the cellular infrastructure.

Thus, what is needed is a mobile aerial communications antenna that is relatively simple, inexpensive, may be positioned rapidly, and may be moved to achieve the best available transmission and reception characteristics. What is also needed is a mobile aerial communications antenna that may either have connectivity or act as a relay. What is further needed is a mobile aerial communications antenna that may be deployed in search and rescue operations.

Currently, the location of a mobile communications device may be determined using a plurality of triangulation methods. These triangulation methods compare the signal strength of the mobile communications device as received by a plurality of mobile communications antennas, providing the location of the mobile communications device with respect to each of the plurality of mobile communications antennas. For example, the location of a cellular telephone with respect to a given cellular antenna may be determined by analyzing the relative signal strength of the cellular telephone as received by the cellular antenna. The location of a mobile communications device including a global positioning system ("GPS") receiver may also be periodically reported to a mobile communications services provider by the mobile communications device itself. These mobile communications location services are important because they may allow a mobile communications device, and a mobile communications services customer, to be located in the event of a disaster or an emergency.

In the event of a disaster or an emergency, however, the signal of the mobile communications device may be blocked or diminished by rubble or debris, or weakened by low battery power. Similarly, the signal may never be received if the mobile communications antenna towers in the area are destroyed or disabled. Thus, what is needed is a mobile aerial communications antenna that is capable of moving into and/or over a disaster area such that blocked, diminished, weakened, or otherwise unreceived mobile communications device signals may be detected, allowing the location of a mobile communications device and a mobile communications services customer to be determined.

BRIEF SUMMARY OF THE INVENTION

The present invention provides a mobile aerial communications antenna, also referred to herein as a "mobile aerial cell" ("MAC") device, one embodiment of which includes a transportation system, a communications system, and a control system. The transportation system allows the mobile aerial communications antenna to be maneuvered in three dimensions, providing six degrees of freedom. The communications system is operably connected to the transportation system and includes a plurality of communications devices suspended in free space. The control system controls the operation of the transportation system and/or the communications system.

In one embodiment of the present invention, a mobile aerial communications antenna assembly includes a mobile aerial assembly and a transportation system operably connected to the mobile aerial assembly, wherein the transportation system includes a lift source operable for generating a lift force and a plurality of directional forces, providing the mobile aerial assembly with maneuverability in three dimensions. The mobile aerial communications antenna assembly also includes a communications system operably connected to the mobile aerial assembly, wherein the communications system includes a communications device operable for transmitting and receiving a plurality of mobile communications signals. The mobile aerial communications antenna assembly further includes a control system in communication with the transportation system and/or the communications system, the control system operable for controlling the operation of the transportation system and/or the communications system.

In another embodiment of the present invention, a method for using a mobile aerial communications antenna assembly includes providing a mobile aerial assembly and providing a transportation system operably connected to the mobile aerial assembly, wherein the transportation system includes a lift source operable for generating a lift force and a plurality of directional forces, providing the mobile aerial assembly with maneuverability in three dimensions. The method for using the mobile aerial communications antenna assembly also includes providing a communications system operably connected to the mobile aerial assembly, wherein the communications system includes a communications device operable for transmitting and receiving a plurality of mobile communications signals. The method for using the mobile aerial communications antenna assembly further includes providing a control system in communication with the transportation system and/or the communications system, the control system operable for controlling the operation of the transportation system and/or the communications system. The method for using the mobile aerial communications antenna assembly further includes maneuvering the mobile aerial assembly into an area of mobile communications services demand.

In a further embodiment of the present invention, a method for using a mobile aerial communications antenna assembly in a search and rescue operation includes providing a mobile aerial assembly and providing a transportation system operably connected to the mobile aerial assembly, wherein the transportation system includes a lift source operable for generating a lift force and a plurality of directional forces, providing the mobile aerial assembly with maneuverability in three dimensions. The method for using the mobile aerial communications antenna assembly in a search and rescue operation also includes providing a communications system operably connected to the mobile aerial assembly, wherein the communications system includes a communications device operable for receiving a mobile communications signal transmitted by a mobile communications device. The method for using the mobile aerial communications antenna assembly in a search and rescue operation further includes providing a control system in communication with the transportation system and/or the communications system, the control system operable for controlling the operation of the transportation system and/or the communications system. The method for using the mobile aerial communications antenna assembly in a search and rescue operation further includes maneuvering the mobile aerial assembly into a search and rescue area, monitoring a signal strength of the mobile communications signal, maneuvering the mobile aerial assembly in a direction of increasing signal strength, and locating the mobile communications device.

Advantageously, the mobile aerial communications antenna of the present invention is relatively simple, inexpensive, may be positioned rapidly, and may be moved to achieve the best available transmission and reception characteristics. The mobile aerial communications antenna may also either have connectivity or act as a relay. The mobile aerial communications antenna may be used, for example, as a temporary cellular antenna, where the use of a conventional large, fixed cellular antenna tower is impractical, or where it is difficult to position a conventional mobile cellular antenna. The mobile aerial communications antenna may further be deployed in search and rescue operations.

DETAILED DESCRIPTION OF THE INVENTION

Figure 1:
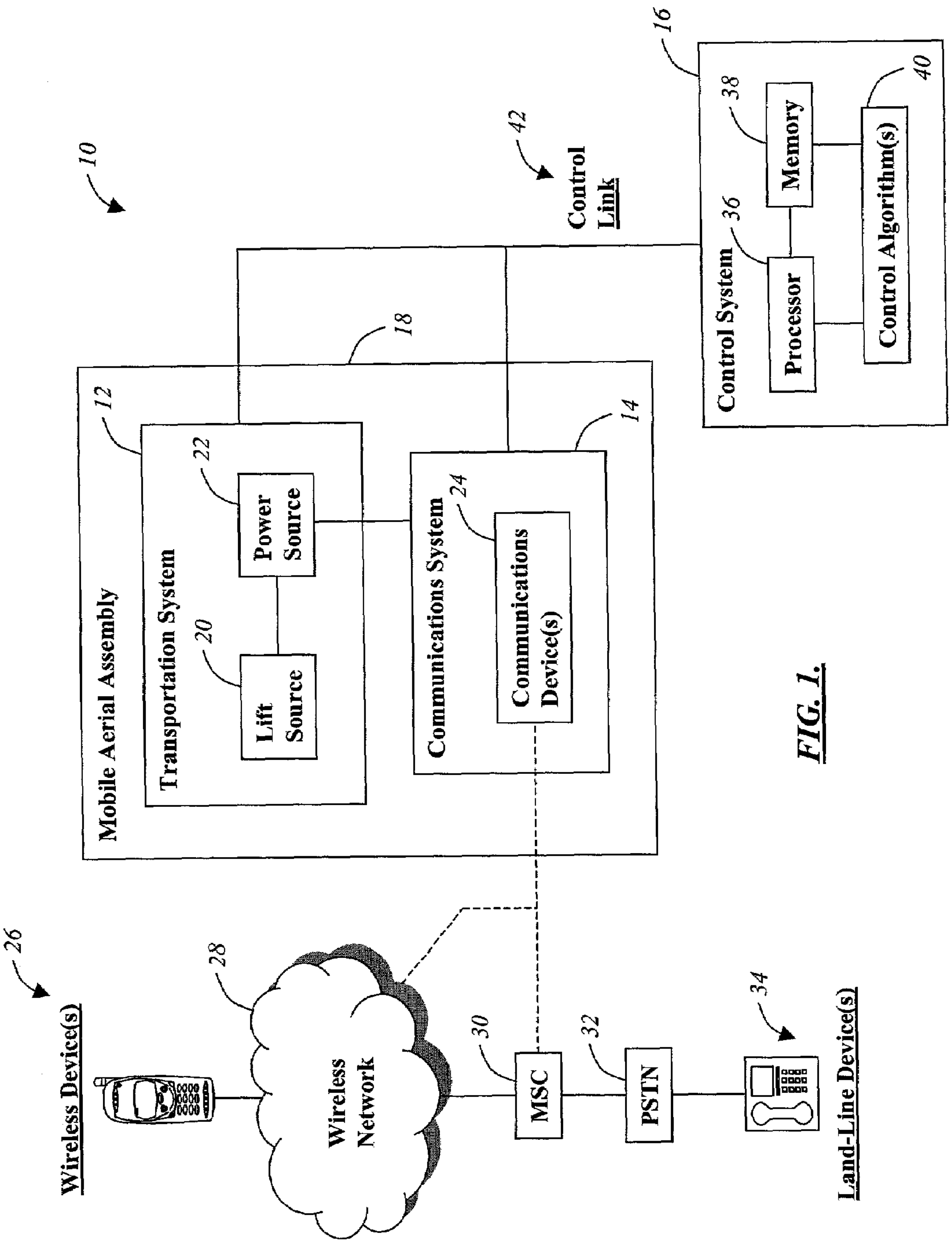
FIG. 1 is a schematic diagram of one embodiment of the mobile aerial communications antenna assembly of the present invention, incorporating a ground-based control system and a self-contained power source.

Referring to FIG. 1, in one embodiment of the present invention, a mobile aerial communications antenna assembly 10 includes a transportation system 12, a communications system 14, and a control system 16. Together, the transportation system 12 and the communications system 14 form a portion of a mobile aerial assembly 18. The transportation system 12 includes a lift source 20 and a power source 22. The lift source 20 is operable for generating a lift force and a plurality of other directional forces, such that the mobile aerial assembly 18 may be maneuvered in three dimensions, providing six degrees of freedom (up/down, left/right, forward/backward, roll, pitch, and yaw). The lift source 20 may include, for example, one or more propellers or ducted fans coupled with one or more electric motors or combustion engines, or a vessel or chamber that is filled with a gas that is lighter than air. The vessel or chamber may be, for example, a blimp or balloon. Preferably, the lift source 20 also includes a plurality of flight control actuators and/or surfaces, such as servo mechanisms, rudders, stabilizers, ailerons, flaps, slats, or other deflection mechanisms. The plurality of flight control actuators and/or surfaces are operable for directing the lift force and the plurality of other directional forces generated by the lift source 20 and maneuvering the mobile aerial assembly 18. The power source 22 is operable for providing power to the lift source 20 and other components of the transportation system 12 and/or the communications system 14. The power source 22 may be, for example, a battery, a fuel cell, a generator, a solar collector, a fuel supply, or any combination thereof. The transportation system 12 and its components are described in greater detail herein below.

The communications system 14 includes one or more communications devices 24 operable for transmitting signals to and receiving signals from a plurality of mobile communications devices, and a plurality of mobile communications services customers. The plurality of mobile communications devices may be, for example, a plurality of cellular telephones, pagers, personal digital assistants ("PDAs"), laptop computers, or the like. These mobile communications devices are typically referred to by those of ordinary skill in the art as "wireless devices." The plurality of wireless devices 26 may utilize any suitable network, system, protocol, or methodology. For example, the plurality of wireless devices 26 may be second-generation ("2G") devices, second-and-a-half-generation ("2-½G") devices, or third generation ("3G") devices. The plurality of wireless devices 26 may transmit signals using a frequency-division multiple-access ("FDMA") method, a time-division multiple-access ("TDMA") method, or a code-division multiple-access ("CDMA") method. The plurality of wireless devices 26 may use any suitable communications standard, such as an advanced mobile phone system ("AMPS") standard, a narrowband advanced mobile phone system ("NAMPS") standard, a global system for mobile communications ("GSM") standard, or any derivation thereof. The plurality of wireless devices 26 may also use a network such as a personal communications service ("PCS")-based network, an integrated digital enhanced network ("IDEN"), or a CDMA network. Accordingly, the one or more communications devices 24 may include one or more transmitters and/or receivers, and one or more cellular antennas or the like. Optionally, the one or more communications devices 24 are in communication with a wireless network 28 and the plurality of wireless devices 26. The one or more communications devices 24 may also be in communication with a mobile switching center ("MSC") 30 and a public-switched telephone network ("PSTN") 32. The MSC 30 and the PSTN 32 allow the plurality of wireless devices 26 to communicate with a plurality of land-line devices 34, such as conventional telephones. In other words, the communications system 14 and the one or more communications devices 24 may have "connectivity." Alternatively, the one or more communications devices 24 may function as relays, providing only peer-to-peer (cellular antenna-to-cellular antenna) communications. In this context, the mobile aerial communications antenna assembly 10 may function as a "base station" or simply as a relay.

The mobile aerial assembly 18 includes one or more structures and/or housings operable for supporting and protecting the transportation system 12 and the communications system 14. In this context, the mobile aerial assembly 18 functions as a "flying communications platform." The mobile aerial assembly 18 and its components are described in greater detail herein below.

The control system 16, as a whole, is operable for controlling the operation of the transportation system 12 and/or the communications system 14. The control system 16 includes a processor 36, a memory 38, and one or more control algorithms 40. The processor 36 may be, for example, a microprocessor, such as that manufactured by Advanced Micro Devices, Inc. (Sunnyvale, Calif.), Intel Corporation (Santa Clara, Calif.), International Business Machines Corp. (Armonk, N.Y.), Motorola, Inc. (Schaumburg, Ill.), or Transmeta Corp. (Santa Clara, Calif.). The processor 36 includes an arithmetic logic unit ("ALU") that performs arithmetic and logic operations and a control unit ("CU") that extracts instructions from the memory 38. The memory 38 preferably includes a random-access memory ("RAM") and a read-only memory ("ROM"), and may include other types of memory as well. The one or more control algorithms 40 include hardware disposed within the processor 36 or software disposed within the memory 38. The one or more control algorithms 40 are, in part, operable for controlling the operation of the transportation system 12 and/or the communications system 14. For example, the one or more control algorithms 40 are operable for controlling the operation of the lift source 20 and the plurality of flight control actuators and/or surfaces, directing the lift force and the plurality of other directional forces generated by the lift source 20, and maneuvering the mobile aerial assembly 18. The one or more control algorithms 40 are also operable for controlling the operation of the one or more communications devices 24 such that signals are transmitted to and received from the plurality of wireless devices 26 with the best available characteristics. The one or more control algorithms 40 are further operable for controlling the power source 22 and other components of the mobile aerial communications antenna assembly 10, and performing diagnostics and maintenance functions. The control system 16 is operably connected to the transportation system 12 and/or the communications system 14 by a control link 42. The control link 42 may include a physical connection, such as a cable, a wire, or fiber optics, or radio signals.

The control system 16 may include a user interface that allows a user to manually control the operation of the transportation system 12 and/or the communications system 14, or the control system 16 may automatically control the operation of the transportation system 12 and/or the communications system 14. In the former case, the user interface preferably includes a data input device, such as a keyboard, a graphical user interface ("GUI"), such as a display, and a plurality of joysticks, switches, and/or other control mechanisms. In the later case, the control system 16 preferably includes a positioning system that provides the position of the mobile aerial assembly 18. This position may be provided in terms of latitude, longitude, altitude, direction, and speed of movement. The date, time, and other useful information may also be provided. The positioning system may be, for example, a global positioning system ("GPS"). Preferably, a GPS receiver is disposed within the mobile aerial assembly 18. The positioning system allows the position of the mobile aerial assembly 18 to be maintained, either manually or automatically, at given coordinates.

Figure 2:
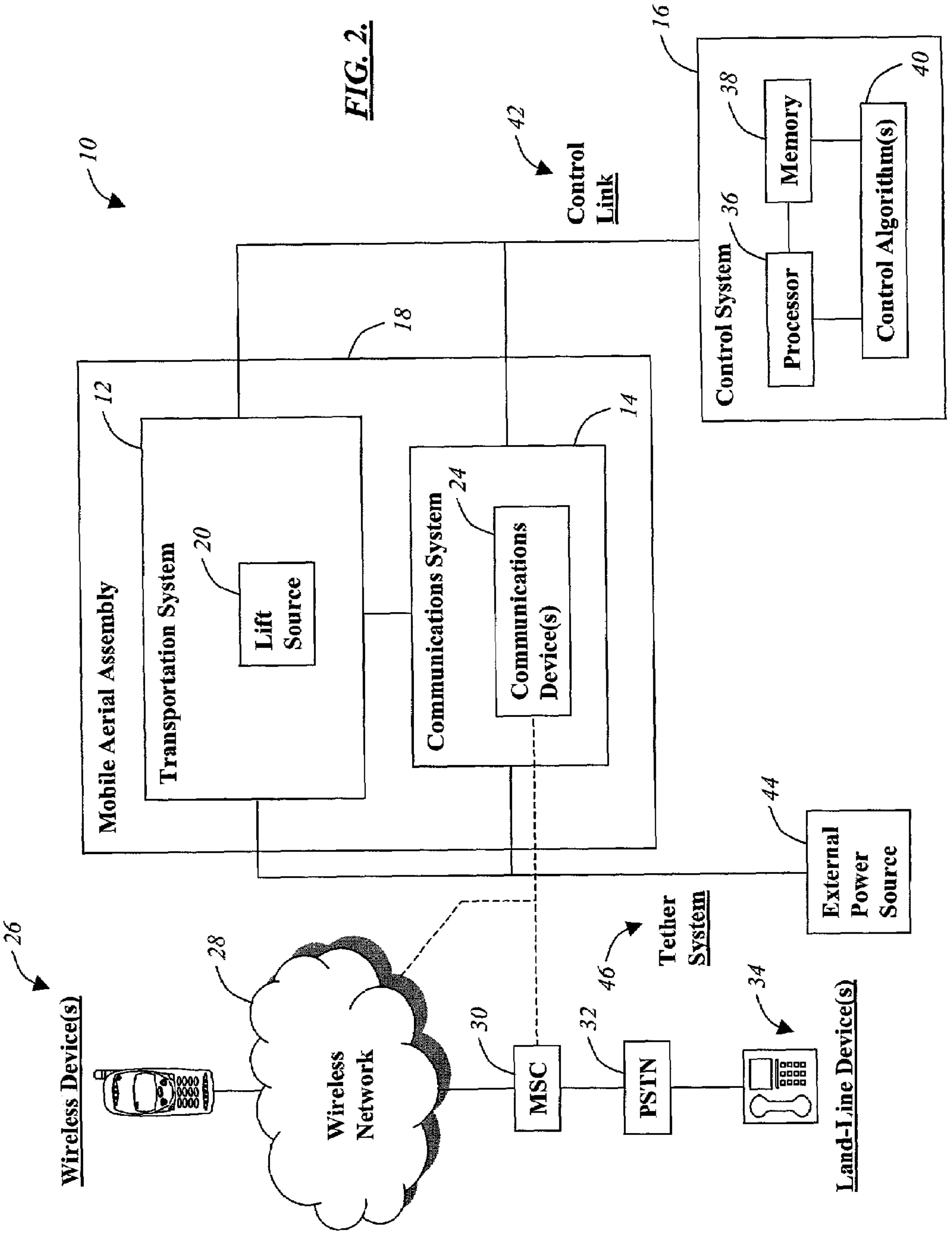
FIG. 2 is a schematic diagram of another embodiment of the mobile aerial communications antenna assembly of the present invention, incorporating a ground-based control system and an external power source.

Referring to FIG. 2, in another embodiment of the present invention, an external power source 44 is used in place of the power source 22 (FIG. 1) described above to provide power to the lift source 20 and the other components of the transportation system 12 and/or the communications system 14. The external power source 44 may be, for example, a battery, a fuel cell, a generator, a solar collector, a fuel supply, or any combination thereof. The external power source 44 is operably connected to the mobile aerial assembly 18, including the transportation system 12 and/or the communications system 14, using a tether system 46. The tether system 46 may include a wire encompassed by a sheath, a cable, and/or any other suitable power transmission components, including reinforcing members and/or structures. Preferably, the tether system 46 is made of a strong, lightweight, flexible, waterproof/water-resistant material, such as a plastic, a polymer, a fabric, or a composite fiber. Optionally, if the control link 42 includes a physical connection, the control link 42 may be integrally formed or combined with the tether system 46.

Figure 3:
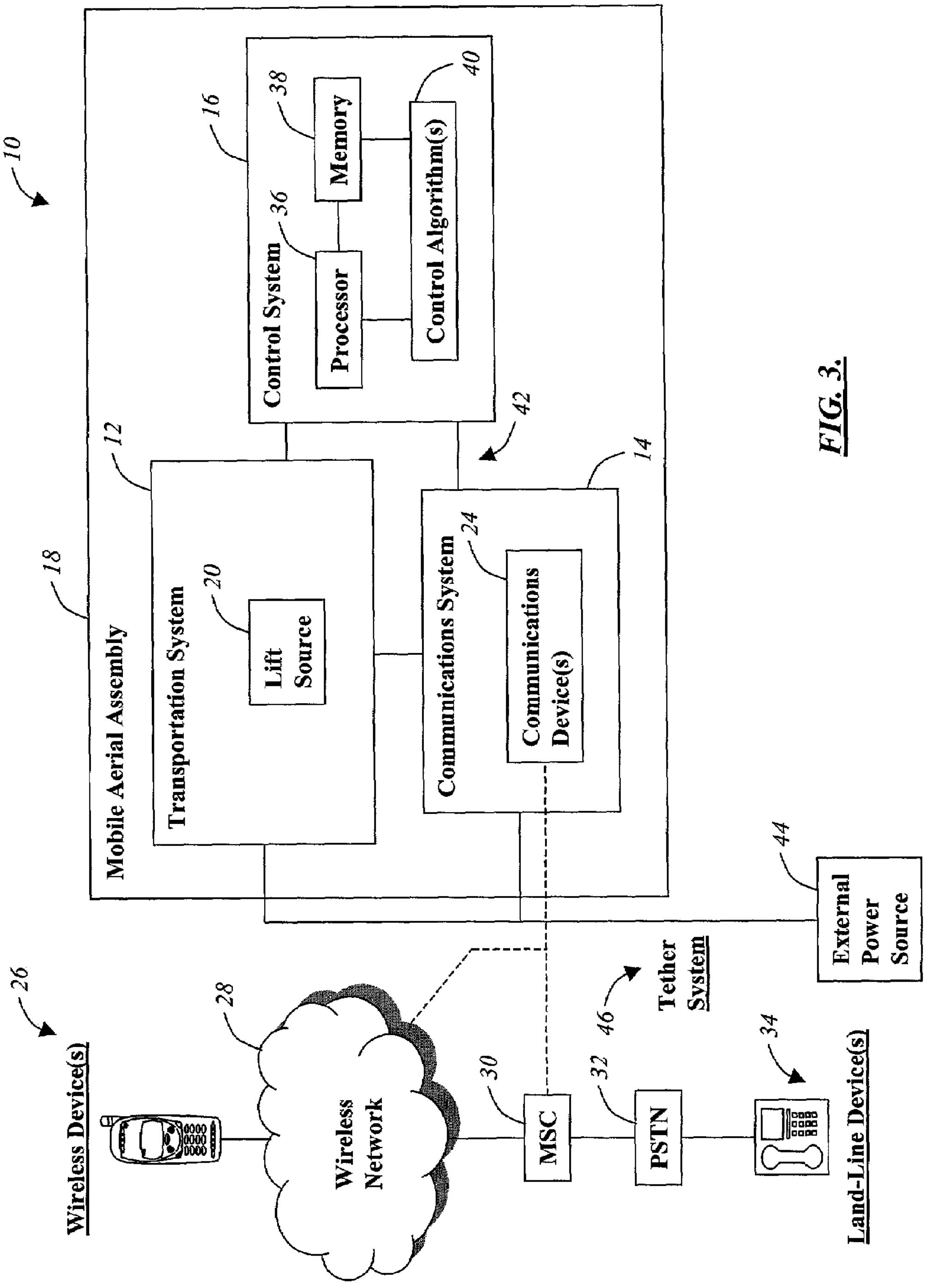
FIG. 3 is a schematic diagram of a further embodiment of the mobile aerial communications antenna assembly of the present invention, incorporating a self-contained control system and an external power source.

Referring to FIG. 3, in a further embodiment of the present invention, the mobile aerial assembly 18 includes, in part, the transportation system 12, the communications system 14, and the control system 16. Thus, the control link 42 is internal to the mobile aerial assembly 18. This configuration is suited to cases in which the control system 16 automatically controls the operation of the transportation system 12 and/or the communications system 14. The position of the mobile aerial assembly 18 is maneuvered to and/or maintained at given coordinates with the aide of the positioning system.

Figure 4:
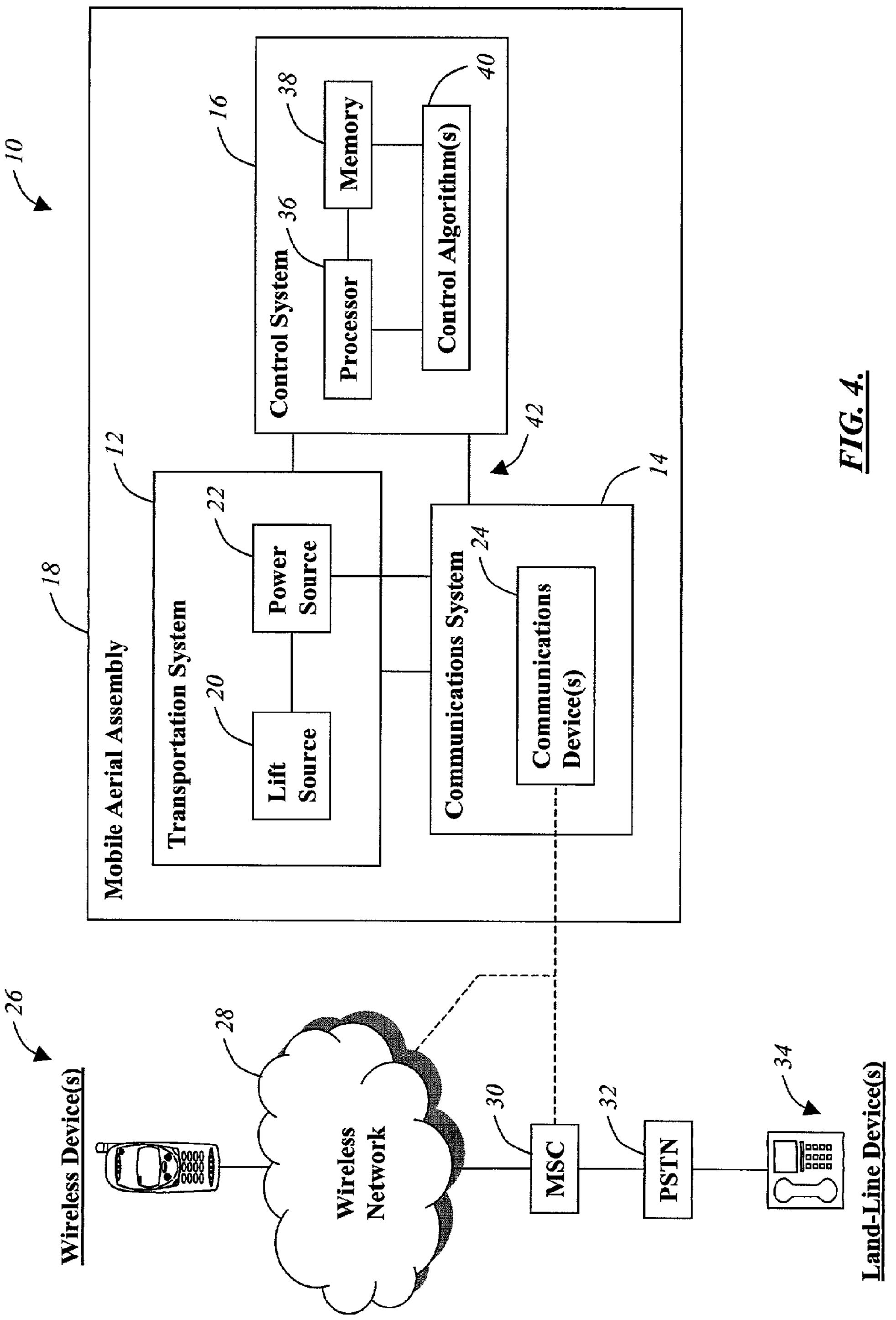
FIG. 4 is a schematic diagram of a further embodiment of the mobile aerial communications antenna assembly of the present invention, incorporating a self-contained control system and a self-contained power source.

Referring to FIG. 4, in a further embodiment of the present invention, the mobile aerial assembly 18 includes the transportation system 12, the communications system 14, the control system 16, the control link 42, and the power source 22, making the mobile aerial communications antenna assembly 10 completely self-contained. Again, this configuration is suited to cases in which the control system 16 automatically controls the operation of the transportation system 12 and/or the communications system 14. The position of the mobile aerial assembly 18 is maneuvered to and/or maintained at given coordinates with the aide of the positioning system.

Figure 5:
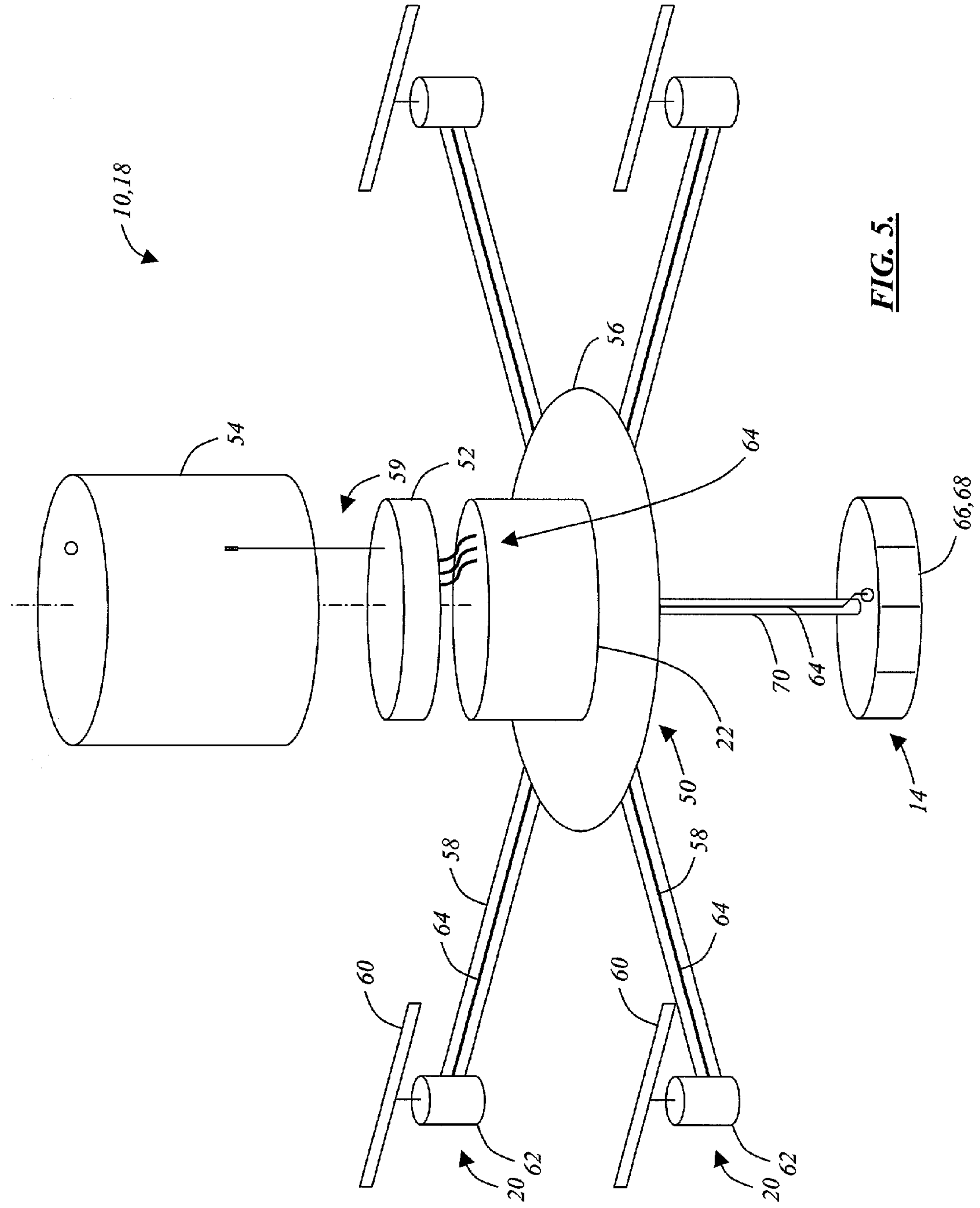
FIG. 5 is a perspective view of one exemplary embodiment of the mobile aerial communications antenna assembly of the present invention, incorporating a plurality of propellers and a plurality of electric motors.

Referring to FIG. 5, in one exemplary embodiment of the present invention, the mobile aerial communications antenna assembly 10 and the mobile aerial assembly 18 include a support structure 50 operable for supporting an onboard control system 52, the lift source 20, and the power source 22. The mobile aerial assembly 18 also includes a protective housing 54 operable for protecting the onboard control system 52 and the power source 22. The support structure 50 includes a disc-shaped member 56 operable for supporting the onboard control system 52 and the power source 22 and a plurality of support arms 58 operable for supporting the lift source 20. The plurality of support arms 58 extend radially-outward from the disc-shaped member 56. Preferably, the disc-shaped member 56 and the plurality of support arms 58 are made of a strong, lightweight, waterproof/water-resistant material, such as a metal, a plastic, a polymer, a wood, or a composite fiber. The disc-shaped member 56 and the plurality of support arms 58 may include a plurality of holes or voids, reducing the overall weight of the components. In the embodiment shown, the protective housing 54 has a cylindrical shape, however, other suitable shapes may be used provided the protective housing 54 may be disposed over and around the onboard control system 52 and the power source 22. The protective housing 54 may also be made of, for example, a metal, a plastic, a polymer, a wood, or a composite fiber material.

The onboard control system 52 includes a plurality of circuits, switches, and jacks operable for controlling the operation of the transportation system 12 (FIGS. 1-4), including the lift source 20, and/or the communications system 14. The onboard control system 52 represents a portion of the overall control system 16 (FIGS. 1-4). A ground-based controller (not shown) represents the other portion. The ground-based controller includes a plurality of joysticks, switches, and/or other control mechanisms operable for controlling the operation of the transportation system 12, including the lift source 20, such that the mobile aerial assembly 18 may be maneuvered in three dimensions, providing six degrees of freedom. For example, the joysticks may be moved/positioned such that the mobile aerial assembly 18 moves up or down, left or right, forward or backward, rolls, pitches, or yaws. Preferably, the onboard control system 52 communicates with the ground-based controller via radio signals transmitted and received by an onboard antenna 59 and a ground-based antenna (not shown). A tether system/physical control link may also be used.

In the embodiment shown, the lift source 20 includes a plurality of propellers 60 coupled with a plurality of electric motors 62. The lift source 20 also includes a plurality of gears and servo mechanisms operable for directing the lift force and the plurality of other directional forces generated by the plurality of propellers 60 and the plurality of electric motors 62. As described above, the lift source 20 may also include a plurality of ducted fans coupled with the plurality of electric motors 62 and a plurality of flight control surfaces, such as rudders, stabilizers, ailerons, flaps, slats, or other deflection mechanisms.

The power source 22 is operable for providing power to the lift source 20 and the other components of the transportation system 12, the communications system 14, and the control system 16. The power source 22 may be, for example, a battery, a fuel cell, a generator, or a solar collector. The power source 22 is connected to the plurality of electric motors 62, the communications system 14, and the onboard control system 52 via a plurality of wires 64. Preferably, the ground-based controller includes a ground-based power source (not shown).

The communications system 14 includes one or more transmitters and/or receivers 66 and one or more cellular antennas 68 operable for transmitting signals to and/or receiving signals from a plurality of wireless communications devices and/or other cellular antennas, and a plurality of wireless communications services customers. In the embodiment shown, the one or more transmitters and/or receivers 66 and the one or more cellular antennas 68 are suspended in free space below the support structure 50 using a suspension member 70. Optionally, the one or more transmitters and/or receivers 66 and/or the one or more cellular antennas 68 may be disposed directly adjacent to and in contact with the support structure 50 and/or disposed within the protective housing 54.

Figure 6:
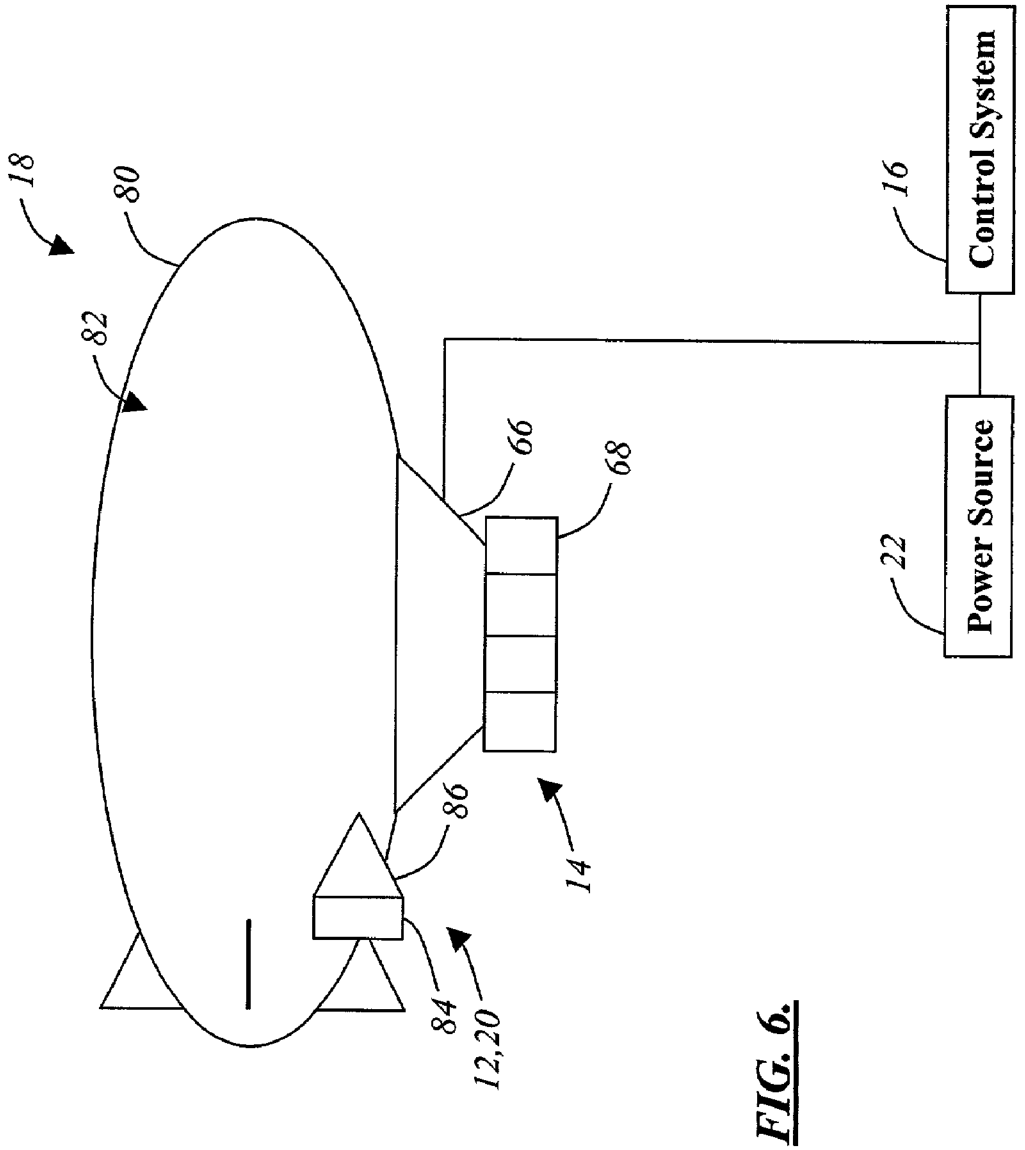
FIG. 6 is a schematic diagram of another exemplary embodiment of the mobile aerial communications antenna assembly of the present invention, incorporating a blimp, a plurality of propellers, and a plurality of combustion engines.

Referring to FIG. 6, in another exemplary embodiment of the present invention, the transportation system 12 and the lift source 20 include a vessel or chamber 80 that is filled with a gas 82 that is lighter than air, such as a blimp or balloon. The lift source 20 also includes one or more propellers or ducted fans 84 coupled with one or more electric motors or combustion engines 86. The lift source 20 further includes a plurality of flight control actuators and/or surfaces (not shown), such as servo mechanisms, rudders, stabilizers, ailerons, flaps, slats, or other deflection mechanisms. The plurality of flight control actuators and/or surfaces are operable for directing the lift force and the plurality of other directional forces generated by the lift source 20 and maneuvering the mobile aerial assembly 18. The communications system 14 is suspended in free space below the transportation system 12. As described above, the communications system 14 includes one or more transmitters and/or receivers 66 and one or more cellular antennas 68 operable for transmitting signals to and/or receiving signals from a plurality of wireless communications devices and/or other cellular antennas, and a plurality of wireless communications services customers. In the embodiment shown, the one or more transmitters and/or receivers 66 and/or the one or more cellular antennas 68 are disposed directly adjacent to and in contact with the transportation system 12 and the blimp or balloon 80.

The blimp or balloon 80 may range in size from about 10 feet to about 50 feet in length, and about 5 feet to about 15 feet in diameter. The blimp or balloon 80 may range in volume from about 250 cubic feet to about 3,000 cubic feet. The blimp or balloon 80 may have payload weight in the range of about 10 pounds to about 100 pounds. For example, a medium-sized blimp manufactured by Mobile Airships (Brantford, ON, CAN) includes a 900 cubic foot poly-vinyl chloride ("PVC") inner bladder and forward ballonet. A pair of 1.4 cubic inch two-stroke gas engines produce 2 horsepower each for powering and maneuvering the blimp. The engines are disposed in a gondola having a mechanism that allows the engines to be vectored 180 degrees. Fully-shrouded, three-bladed propellers are used. Four covered balsa wood fins provide the blimp with stability and a seven-channel radio is used for control. The blimp may be tethered or untethered.

As described above, a conventional cellular antenna typically includes a large steel tower structure that is fixedly attached to a piece of property, such as the ground or a building. This attachment is typically accomplished using concrete pilings or castings, a support structure, or the like. The cellular antenna also typically includes one or more protective structures, such as one or more steel boxes or a small building, that house one or more transmitters and/or receivers operable for serving a plurality of wireless devices, and a plurality of wireless services customers. In this context, the conventional cellular antenna may function as a "base station," and an expensive piece of infrastructure.

The wireless field has experienced explosive growth in recent years. This growth has been due, in large part, to an increase in the ownership and usage of wireless devices, such as cellular telephones, pagers, PDAs, laptop computers, and the like. This growth is expected to continue as these wireless devices become more sophisticated and as mobile Internet access improves. This increase in the demand for wireless services has been especially pronounced in metropolitan areas, where large numbers of wireless services customers are present. The density of cellular antennas is at its highest in such areas. Problems may arise, however, when there is a temporary increase in the demand for wireless services in these areas, or when there is a temporary increase in the demand for wireless services in otherwise low-demand areas not served by many cellular antennas. For example, problems may arise when a sporting event is held or when a disaster or emergency occurs in a metropolitan area, or when a festival is held in a rural area. If there is an existing cellular infrastructure, it may be overwhelmed in such cases. What is typically needed is a temporary increase in the density of cellular antennas to meet the temporary increase in the demand for wireless services.

One possible solution to the problems described above is to position a temporary or mobile cellular antenna in the area experiencing the increase in the demand for wireless services. A conventional temporary cellular antenna typically includes a small steel tower structure that is fixedly attached to a piece of property, such as the ground or a building. This attachment is typically accomplished using a support structure or the like. A conventional mobile cellular antenna also typically includes a small steel tower structure. The small steel tower structure, however, is typically movably attached to a vehicle, such as a van or a flatbed truck. Although such solutions are marginally effective, it is not always possible to position a temporary or mobile cellular antenna in an area experiencing an increase in the demand for wireless services. In metropolitan areas, for example, the use of such structures may be prohibited by zoning regulations or space constraints. In rural areas, for example, the use of such structures may be prohibited by environmental regulations or geographical/topographical constraints. Even if a temporary or mobile cellular antenna may be positioned in the area experiencing an increase in the demand for wireless services, it may not be possible to move the temporary or mobile cellular antenna to achieve the best available transmission and reception characteristics. In other words, it may not be possible to optimize the performance of the temporary or mobile cellular antenna and the cellular infrastructure.

Advantageously, the mobile aerial communications antenna of the present invention is relatively simple, inexpensive, may be positioned rapidly, and may be moved to achieve the best available transmission and reception characteristics. The mobile aerial communications antenna may also either have connectivity or act as a relay. The mobile aerial communications antenna may be used, for example, as a temporary cellular antenna, where the use of a conventional large, fixed cellular antenna tower is impractical, or where it is difficult to position a conventional mobile cellular antenna.

Currently, the location of a wireless device may be determined using a plurality of triangulation methods. These triangulation methods compare the signal strength of the wireless device as received by a plurality of mobile communications antennas, providing the location of the wireless device with respect to each of the plurality of mobile communications antennas. For example, the location of a cellular telephone with respect to a given cellular antenna may be determined by analyzing the relative signal strength of the cellular telephone as received by the cellular antenna. The location of a wireless device including a global positioning system ("GPS") receiver may also be periodically reported to a wireless services provider by the wireless device itself. These wireless location services are important because they may allow a wireless device, and a wireless services customer, to be located in the event of a disaster or an emergency.

In the event of a disaster or an emergency, however, the signal of the wireless device may be blocked or diminished by rubble or debris, or weakened by low battery power. Similarly, the signal may never be received if the mobile communications antenna towers in the area are destroyed or disabled. Advantageously, the mobile aerial communications antenna of the present invention may be deployed in search and rescue operations, moving into and/or over a disaster area such that blocked, diminished, weakened, or otherwise unreceived wireless device signals may be detected, allowing the location of a wireless services customer to be determined.

Figure 7:
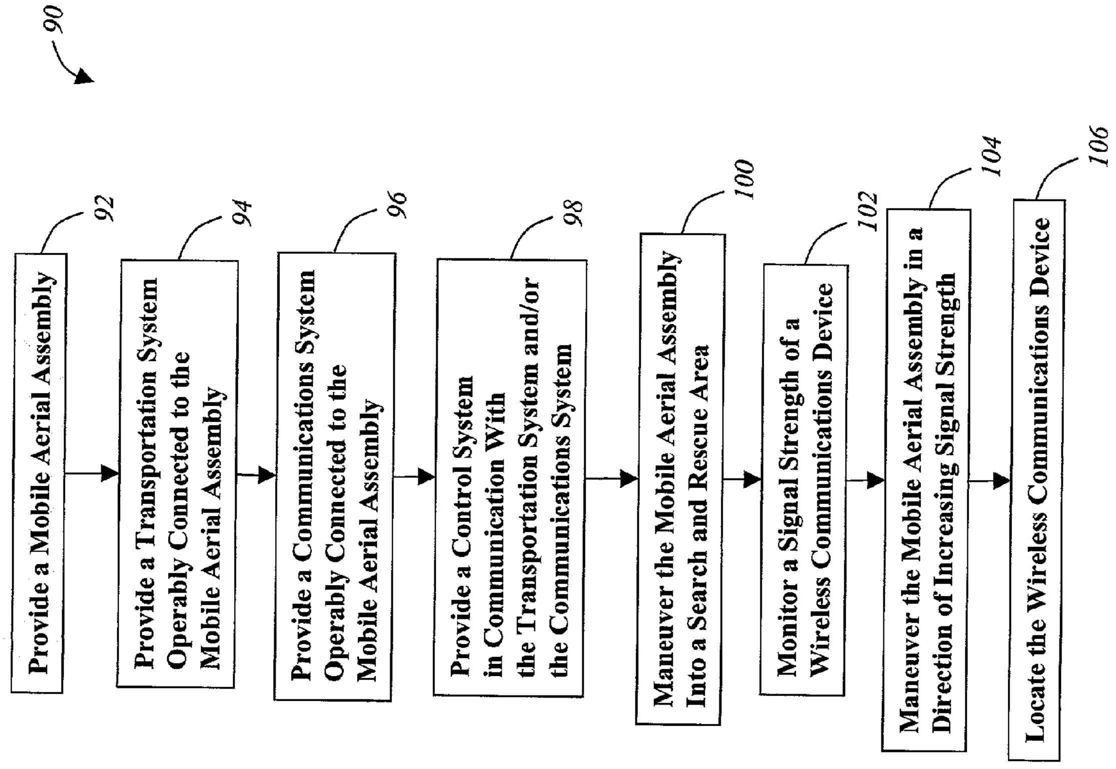
FIG. 7 is a flow chart of one embodiment of a method for using the mobile aerial communications antenna assembly of the present invention in a search and rescue operation.

Referring to FIG. 7, in a further embodiment of the present invention, a method 90 for using the mobile aerial communications antenna assembly 10 (FIGS. 1-5) of the present invention in a search and rescue operation includes providing the mobile aerial assembly 18 (FIGS. 1-6) (Block 92) and providing the transportation system 12 (FIGS. 1-6) operably connected to the mobile aerial assembly 18 (Block 94), wherein the transportation system 12 includes the lift source 20 (FIGS. 1-6) operable for generating the lift force and the plurality of directional forces, providing the mobile aerial assembly 18 with maneuverability in three dimensions. The method 90 also includes providing the communications system 14 (FIGS. 1-6) operably connected to the mobile aerial assembly 18 (Block 96), wherein the communications system 14 includes the one or more communications devices 24 (FIGS. 1-6) operable for receiving the wireless communications signal transmitted by a wireless communications device 26 (FIGS. 1-4). The method 90 further includes providing the control system 16 (FIGS. 1-6) in communication with the transportation system 12 and/or the communications system 14 (Block 98), the control system 16 operable for controlling the operation of the transportation system 12 and/or the communications system 14. The mobile aerial assembly 18 is maneuvered into the search and rescue area (Block 100) and the signal strength of the wireless communications signal is monitored (Block 102). The mobile aerial assembly 18 is maneuvered in a direction of increasing signal strength (Block 104) and the wireless communications device 26, and hopefully the wireless services customer, are located (Block 106).

It is apparent that there has been provided, in accordance with the present invention, a mobile aerial communications antenna assembly. While the present invention has been shown and described in conjunction with examples and preferred embodiments thereof, variations in and modifications to the present invention may be effected by those of ordinary skill in the art without departing from the spirit or scope of the invention. For example, although the present invention has shown and described a mobile aerial communications antenna assembly associated with wireless devices such as cellular phones, pagers, PDAs, and laptop computers, the mobile aerial communications antenna of the present invention may also be used in conjunction with Bluetooth-capable or peer-to-peer communications-enabled devices. It is therefore to be understood that the principles described herein apply in a similar manner, where applicable, to all examples and preferred embodiments and the following claims are intended to cover all such equivalents.

What is claimed is:

1. A mobile aerial communications antenna assembly, comprising:

a mobile aerial assembly;

a transportation system operably connected to the mobile aerial assembly, wherein the transportation system comprises a lift source operable for generating a lift force sufficient to suspend the mobile aerial assembly in free space, providing the mobile aerial assembly with maneuverability in three dimensions;

a communications system operably connected to the mobile aerial assembly, wherein the communications system comprises a communications device operable for transmitting and receiving a plurality of mobile communications signals; and a control system in communication with the transportation system, the control system operable for controlling the operation of the transportation system.

2. The mobile aerial communications antenna assembly of claim 1, wherein the lift source is operable for generating a plurality of directional forces.

3. The mobile aerial communications antenna assembly of claim 1, wherein the control system is in communication with the communications system, the control system operable for controlling the operation of the communications system.

4. The mobile aerial communications antenna assembly of claim 1, wherein the mobile aerial assembly comprises a support structure.

5. A mobile aerial communications antenna assembly, comprising:

a mobile aerial assembly;

a transportation system operably connected to the mobile aerial assembly, wherein the transportation system comprises a lift source operable for generating a lift force, providing the mobile aerial assembly with maneuverability in three dimensions;

a communications system operably connected to the mobile aerial assembly, wherein the communications system comprises a communications device operable for transmitting and receiving a plurality of mobile communications signals;

a control system in communication with the transportation system, the control system operable for controlling the operation of the transportation system; and wherein the mobile aerial assembly comprises a protective housing.

6. A mobile aerial communications antenna assembly, comprising:

a mobile aerial assembly;

a transportation system operably connected to the mobile aerial assembly, wherein the transportation system comprises a lift source operable for generating a lift force, providing the mobile aerial assembly with maneuverability in three dimensions;

a communications system operably connected to the mobile aerial assembly, wherein the communications system comprises a communications device operable for transmitting and receiving a plurality of mobile communications signals;

a control system in communication with the transportation system, the control system operable for controlling the operation of the transportation system; and wherein the lift source comprises a lift source selected from the group consisting of a propeller and a ducted fan.

7. The mobile aerial communications antenna assembly of claim 6, wherein the lift source further comprises a lift source selected from the group consisting of an electric motor and a combustion engine.

8. A mobile aerial communications antenna assembly, comprising:

a mobile aerial assembly;

a transportation system operably connected to the mobile aerial assembly, wherein the transportation system comprises a lift source operable for generating a lift force, providing the mobile aerial assembly with maneuverability in three dimensions;

a communications system operably connected to the mobile aerial assembly, wherein the communications system comprises a communications device operable for transmitting and receiving a plurality of mobile communications signals;

a control system in communication with the transportation system, the control system operable for controlling the operation of the transportation system; and wherein the lift source comprises a lift source selected from the group consisting of a blimp and a balloon.

9. The mobile aerial communications antenna assembly of claim 1, wherein the lift source comprises a flight control device.

10. A mobile aerial communications antenna assembly, comprising:

a mobile aerial assembly;

a transportation system operably connected to the mobile aerial assembly, wherein the transportation system comprises a lift source operable for generating a lift force, providing the mobile aerial assembly with maneuverability in three dimensions;

a communications system operably connected to the mobile aerial assembly, wherein the communications system comprises a communications device operable for transmitting and receiving a plurality of mobile communications signals;

a control system in communication with the transportation system, the control system operable for controlling the operation of the transportation system;

wherein the lift source comprises a flight control device; and wherein the flight control device comprises a flight control device selected from the group consisting of a servo mechanism, a rudder, a stabilizer, an aileron, a flap, a slat, and a deflection mechanism.

11. The mobile aerial communications antenna assembly of claim 1, wherein the communications device is operable for transmitting and receiving a plurality of mobile communications signals to and from a plurality of mobile communications devices.

12. The mobile aerial communications antenna assembly of claim 1, wherein the communications device comprises a cellular antenna.

13. The mobile aerial communications antenna assembly of claim 1, wherein the communications device is operable for transmitting and receiving a plurality of mobile communications signals to and from a plurality of cellular antennas.

14. The mobile aerial communications antenna assembly of claim 1, wherein the control system is operably connected to the mobile aerial assembly.

15. A mobile aerial communications antenna assembly, comprising:

a mobile aerial assembly;

a transportation system operably connected to the mobile aerial assembly, wherein the transportation system comprises a lift source operable for generating a lift force, providing the mobile aerial assembly with maneuverability in three dimensions;

a communications system operably connected to the mobile aerial assembly, wherein the communications system comprises a communications device operable for transmitting and receiving a plurality of mobile communications signals;

a control system in communication with the transportation system, the control system operable for controlling the operation of the transportation system; and wherein the control system is operably connected to the transportation system via a tether.

16. A mobile aerial communications antenna assembly, comprising:

a mobile aerial assembly;

a transportation system operably connected to the mobile aerial assembly, wherein the transportation system comprises a lift source operable for generating a lift force, providing the mobile aerial assembly with maneuverability in three dimensions;

a communications system operably connected to the mobile aerial assembly, wherein the communications system comprises a communications device operable for transmitting and receiving a plurality of mobile communications signals;

a control system in communication with the transportation system, the control system operable for controlling the operation of the transportation system; and further comprising a power source operably connected to the transportation system.

17. The mobile aerial communications antenna assembly of claim 16, wherein the power source comprises a power source selected from the group consisting of a battery, a fuel cell, a generator, a solar collector, and a fuel supply.

18. The mobile aerial communications antenna assembly of claim 16, wherein the power source is operably connected to the transportation system via a tether.

19. A method for using a mobile aerial communications antenna assembly, the method comprising:

providing a mobile aerial assembly;

providing a transportation system operably connected to the mobile aerial assembly, wherein the transportation system comprises a lift source operable for generating a lift force sufficient to suspend the mobile aerial assembly in free space and a plurality of directional forces, providing the mobile aerial assembly with maneuverability in three dimensions;

providing a communications system operably connected to the mobile aerial assembly, wherein the communications system comprises a communications device operable for transmitting and receiving a plurality of mobile communications signals;

providing a control system in communication with the transportation system and the communications system, the control system operable for controlling the operation of the transportation system and the communications system; and maneuvering the mobile aerial assembly into an area of mobile communications services demand.

20. The method for using the mobile aerial communications antenna assembly of claim 19, wherein the communications device is operable for transmitting and receiving a plurality of mobile communications signals to and from a plurality of mobile communications devices.

21. The method for using the mobile aerial communications antenna assembly of claim 19, wherein the communications device comprises a cellular antenna.

22. The method for using the mobile aerial communications antenna assembly of claim 19, wherein the communications device is operable for transmitting and receiving a plurality of mobile communications signals to and from a plurality of cellular antennas.

23. A method for using a mobile aerial communications antenna assembly, the method comprising:

providing a mobile aerial assembly;

providing a transportation system operably connected to the mobile aerial assembly, wherein the transportation system comprises a lift source operable for generating a lift force and a plurality of directional forces, providing the mobile aerial assembly with maneuverability in three dimensions;

providing a communications system operably connected to the mobile aerial assembly, wherein the communications system comprises a communications device operable for transmitting and receiving a plurality of mobile communications signals;

providing a control system in communication with the transportation system and the communications system, the control system operable for controlling the operation of the transportation system and the communications system;

maneuvering the mobile aerial assembly into an area of mobile communications services demand; and wherein the control system is operably connected to mobile aerial assembly via a tether.

24. A method for using a mobile aerial communications antenna assembly, the method comprising:

providing a mobile aerial assembly;

providing a transportation system operably connected to the mobile aerial assembly, wherein the transportation system comprises a lift source operable for generating a lift force and a plurality of directional forces, providing the mobile aerial assembly with maneuverability in three dimensions;

providing a communications system operably connected to the mobile aerial assembly, wherein the communications system comprises a communications device operable for transmitting and receiving a plurality of mobile communications signals;

providing a control system in communication with the transportation system and the communications system, the control system operable for controlling the operation of the transportation system and the communications system;

maneuvering the mobile aerial assembly into an area of mobile communications services demand; and further comprising providing a power source operably connected to the transportation system and the communications system.

25. The method for using the mobile aerial communications antenna assembly of claim 24, wherein the power source comprises a power source selected from the group consisting of a battery, a fuel cell, a generator, a solar collector, and a fuel supply.

26. The method for using the mobile aerial communications antenna assembly of claim 24, wherein the power source is operably connected to the transportation system and the communications system via a tether.

27. A method for using a mobile aerial communications antenna assembly, the method comprising:

providing a mobile aerial assembly;

providing a transportation system operably connected to the mobile aerial assembly, wherein the transportation system comprises a lift source operable for generating a lift force and a plurality of directional forces, providing the mobile aerial assembly with maneuverability in three dimensions;

providing a communications system operably connected to the mobile aerial assembly, wherein the communications system comprises a communications device operable for transmitting and receiving a plurality of mobile communications signals;

providing a control system in communication with the transportation system and the communications system, the control system operable for controlling the operation of the transportation system and the communications system;

maneuvering the mobile aerial assembly into an area of mobile communications services demand; and wherein the area of mobile communications services demand comprises an area of temporary mobile communications services demand.

28. A method for using a mobile aerial communications antenna assembly in a search and rescue operation, the method comprising:

providing a mobile aerial assembly;

providing a transportation system operably connected to the mobile aerial assembly, wherein the transportation system comprises a lift source operable for generating a lift force and a plurality of directional forces, providing the mobile aerial assembly with maneuverability in three dimensions;

providing a communications system operably connected to the mobile aerial assembly, wherein the communications system comprises a communications device operable for receiving a mobile communications signal transmitted by a mobile communications device;

providing a control system in communication with the transportation system and the communications system, the control system operable for controlling the operation of the transportation system and the communications system;

maneuvering the mobile aerial assembly into a search and rescue area;

monitoring a signal strength of the mobile communications signal;

maneuvering the mobile aerial assembly in a direction of increasing signal strength; and locating the mobile communications device.

* * * * *